Figure 1:
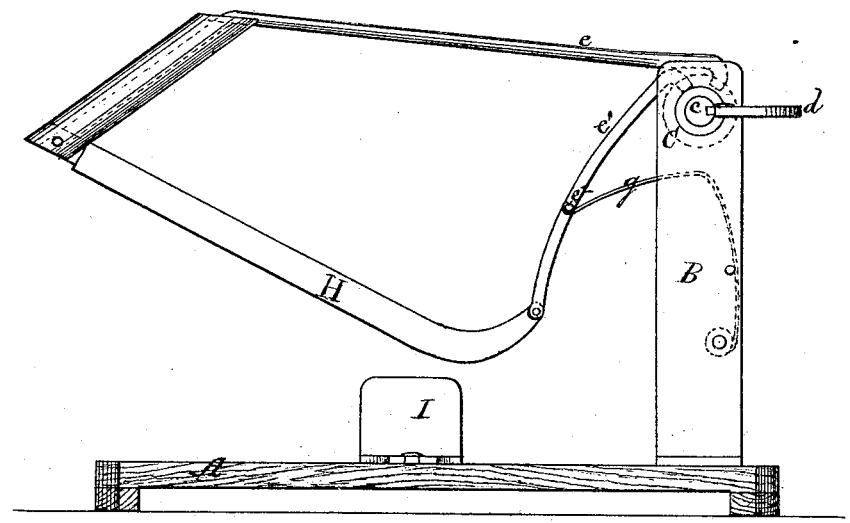

Goodsell & Babcock,
Bread Cutter.

No. 103,601.         Patented May 31, 1870.

Witnesses:
F. H. Pierson
H. M. Tuttle

Inventor:
Geo. D. Goodsell, & N. E. Babcock,
H. W. Beadle atty

United States Patent Office.

GEORGE D. GOODSELL AND NOYES E. BABCOCK, OF ROCKFORD, ILLINOIS.

Letters Patent No. 103,601, dated May 31, 1870.

IMPROVED BREAD-CUTTER.

The Schedule referred to in these Letters Patent and making part of the same.

*To all whom it may concern:*

Be it known that we, GEORGE D. GOODSELL and NOYES E. BABCOCK, of Rockford, in the county of Winnebago and State of Illinois, have invented a new and useful Improvement in Knife for Cutting Bread, &c.; and we do hereby declare that the following is a full and exact description of the same, reference being had to the accompanying drawing and to the letters of reference marked thereon.

This invention has for its object the production of an improved knife for cutting bread, and similar substances, which shall be capable of being operated much more rapidly than the ordinary knife, with much less fatigue to the operator; and consists mainly in the employment of a curved blade, so connected at one of its ends to a vertical standard, as to be capable of a swinging movement.

The details of construction and manner of operation will be fully described hereinafter.

In the drawing—

Figure 1 represents a side elevation of our improved knife, and

Figure 2:
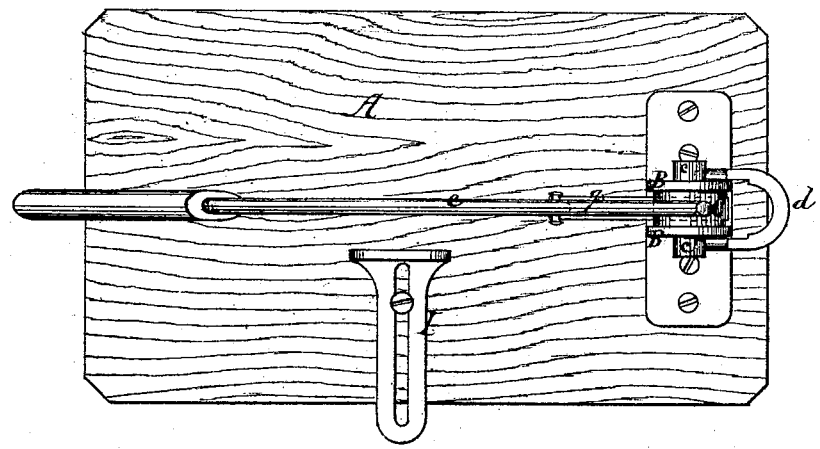

Figure 2, a plan view of the same.

To enable others skilled in the art to make and use our invention, we will now proceed to describe fully its construction and method of operation.

A represents the cutting-board, from which rise the vertical standards B B. These standards may be either rigidly attached to the board A, or they may be hinged thereto, for the purpose of permitting a swinging movement.

C represents a hollow drum, which rests upon the shaft $c$, and is provided with journals, which rest in bearings in the standards, as shown. If desired, these journals may be omitted, in which case the drum would rest only upon the shaft $c$.

$d$ represents a clevis-shaped yoke, the ends of which rest in the ends of the shaft $c$, as shown. This yoke serves the double purpose of holding the knife when it is thrown back, and also of uniting securely the upper ends of the standards.

$e$ $e^1$ represent arms, which are securely attached at one of their ends to the drum C, and at their others to the knife H, as shown.

$e^2$ represents a bar upon the arm $e^1$, which comes into contact with the curved end of the spring $g$, which latter is fixed to the standards, as shown.

H represents the knife, which is made slightly curving at its rear end, as shown. It is, moreover, so attached to the arms $e$ $e^1$ as to come down upon the table with a drawing movement toward the standards, by which means the operation of cutting is much facilitated.

I represents an adjustable gauge, by means of which the width of the articles cut may be determined.

The operation is as follows:

The gauge is first properly adjusted. The bread or other substance to be cut is then placed under the knife against the gauge. The operator now forces down the knife, and the bread or other substance is properly cut. The drawing motion of the knife so facilitates the cutting operation, that warm bread may be easily cut without crushing it.

Having thus fully described our invention,

What we claim as new, and desire to secure by Letters Patent, is—

1. The combination of the base A, standard B, knife H, with arms $e$ $e^1$, drum C, and shaft $c$, when combined substantially as described, for the purpose set forth.

2. In combination with the above, the bail $d$, as described, for the purpose set forth.

This specification signed and witnessed this 16th day of April, 1870.

GEORGE D. GOODSELL.
NOYES E. BABCOCK.

Witnesses:
G. W. FORD,
DANL. GOODLANDER.